(12) United States Patent
Ruhe

(10) Patent No.: US 9,122,495 B2
(45) Date of Patent: Sep. 1, 2015

(54) RELATIVE ADDRESSING USAGE FOR CPU PERFORMANCE

(71) Applicant: BMC Software, Inc., Houston, TX (US)

(72) Inventor: Mark P. Ruhe, Campton Hills, IL (US)

(73) Assignee: BMC SOFTWARE, INC., Houston, TX (US)

( * ) Notice: Subject to any disclaimer, the term of this patent is extended or adjusted under 35 U.S.C. 154(b) by 13 days.

(21) Appl. No.: 13/719,686

(22) Filed: Dec. 19, 2012

(65) Prior Publication Data

US 2014/0173245 A1    Jun. 19, 2014

(51) Int. Cl.
*G06F 9/45* (2006.01)
*G06F 12/10* (2006.01)

(52) U.S. Cl.
CPC ............. *G06F 8/4441* (2013.01); *G06F 8/443* (2013.01); *G06F 12/10* (2013.01)

(58) Field of Classification Search
CPC ....... G06F 8/443; G06F 8/447; G06F 9/3557; G06F 12/0292
USPC ........................................................ 717/153
See application file for complete search history.

(56) References Cited

U.S. PATENT DOCUMENTS 6,708,330 B1 *   3/2004  Moberg et al. ................. 717/158
7,143,266 B1 *  11/2006  Bhardwaj et al. ............. 712/201
2003/0005419 A1 *   1/2003  Pieper et al. .................. 717/141
2003/0097538 A1 *   5/2003  Hall et al. ...................... 711/201
2008/0022276 A1 *   1/2008  Coppinger et al. ............ 717/178
2009/0182992 A1 *   7/2009  Greiner et al. ................ 712/225
2011/0289484 A1 *  11/2011  Caine ............................. 717/127
2012/0233440 A1 *   9/2012  Stephens et al. .............. 711/220

OTHER PUBLICATIONS

Hill, Mark, "A Case for Direct-Mapped Caches," Computer Sciences Technical Report #778, Jun. 1988, 34pg.*
Joseph et al., "Prefetching using Markov Predictors," ACM, 1997, 12pg.*
Zhang et al., "Procedural Level Address Offset Assignment of DSP Applications with Loops," IEEE, 2003, 8pg.*

* cited by examiner

*Primary Examiner* — Ryan Coyer
(74) *Attorney, Agent, or Firm* — Brake Hughes Bellermann LLP

(57) ABSTRACT

The embodiments provide a computing device for incorporating data into code such that the data is relative to the code and, thereby, available for relative addressing. The computing device may include a code generator configured to receive source code from a source code database, and generate executable object code from the source code. The executable object code may include at least one instruction referencing data having an absolute address from a data source. Also, the computing device may include a data incorporator configured to transfer the data from the data source into the executable object code, where the transferred data is relative to the at least one instruction. Further, the computing device may include a relative addresser configured to adjust the at least one instruction to include a relative address for the transferred data including converting the absolute address to the relative address.

20 Claims, 3 Drawing Sheets

RELATIVE ADDRESSING USAGE FOR CPU PERFORMANCE

BACKGROUND

Computing an address based on absolute addressing is relatively slower than computing an address based on relative addressing. For example, executable code that utilizes absolute addressing may increase computer processing unit (CPU) usage as compared with relative addressing. In one example, a load instruction may indicate to load a first register with data from a second register. The address of the data in the second register may be provided in the load instruction in the form of an absolute address (e.g., base register plus displacement), and, when a processor executes this load instruction, the processor must compute the physical address from the absolute address, and then load the data at the calculated address of the second register in the first register. However, when the processor executes a number of instructions referencing data in an absolute address format, the CPU usage may be relatively high.

Not all computer instructions are capable of taking advantage of relative addressing. For example, in the context of code fragments, conventional fragment generators may only incorporate a specific type of data (e.g., literals) that are accessible by a single base register associated with the code portion(s) (e.g., CSECT) into the fragment. The incorporation of literals into the code fragment permits the literals to be addressed using relative addressing. As a result, conventional fragment generators can only take advantage of relative addressing when accessing data within the base registers associated with the CSECT's they are built from.

SUMMARY

The embodiments provide a computing device for incorporating data into code such that the data is relative to the code and, thereby, available for relative addressing. The computing device may include at least one processor, and a non-transitory computer-readable storage medium including instructions executable by the at least one processor. The instructions may be configured to implement a code generator configured to receive source code from a source code database, and generate executable object code from the source code. The executable object code may include at least one instruction referencing data having an absolute address from a data source. Also, the instructions may be configured to implement a data incorporator configured to transfer the data from the data source into the executable object code. The transferred data is relative to the at least one instruction. Further, the instructions may be configured to implement a relative addresser configured to adjust the at least one instruction to include a relative address for the transferred data including converting the absolute address to the relative address.

The relative address may include a relative offset from an address of the at least one instruction. The absolute address may include base register information and displacement information.

The converting the absolute address to the relative address may include replacing the base register information and the displacement information with an offset from a position of the at least one instruction.

The code generator may include one of a compiler, fragment generator, and linker module. The data source may include at least one of a register, working storage, control section, and a control section having a linked list.

The data incorporator configured to transfer the data from the data source into the executable object code may include moving the data from the data source in an area of the executable object code before or after the at least one instruction.

The data incorporator configured to transfer the data from the data source into the executable object code may include transferring the data from the data source according to data specification information. The data specification information may indicate which data to transfer to the executable object code.

The embodiments provide a non-transitory computer-readable medium storing instructions that when executed cause at least one processor to incorporate data into code such that the data is relative to the code and, thereby, available for relative addressing. The instructions include instructions to receive source code from a source code database, and generate executable object code from the source code. The executable object code may include at least one instruction referencing data having an absolute address from a data source. The instructions may include instructions to transfer the data from the data source into the executable object code. The transferred data is relative to the at least one instruction. Also, the instructions may include instructions to adjust the at least one instruction to include a relative address for the transferred data including converting the absolute address to the relative address.

The relative address may include a relative offset from an address of the at least one instruction. The absolute address may include base register information and displacement information.

The converting the absolute address to the relative address may include replacing the base register information and the displacement information with an offset from a position of the at least one instruction.

The instructions may be configured to implement at least a portion of a compiler, fragment generator, or linker module. The data source may include at least one of a register, working storage, control section, and a control section having a linked list.

The transfer the data from the data source into the executable object code may include moving the data from the data source in an area of the executable object code before or after the at least one instruction.

The transfer the data from the data source into the executable object code may include transferring the data from the data source according to data specification information. The data specification information may indicate which data to transfer to the executable object code.

The embodiments may provide a method for incorporating data into code such that the data is relative to the code and, thereby, available for relative addressing. The method may include receiving, with at least one processor, source code from a source code database, and generating, with the at least one processor, executable object code from the source code. The executable object code may include at least one instruction referencing data having an absolute address from a data source. Also, the method may include transferring, with the at least one processor, the data from the data source into the executable object code. The transferred data is relative to the at least one instruction. Further, the method may include adjusting, with the at least one processor, the at least one instruction to include a relative address for the transferred data including converting the absolute address to the relative address.

The relative address may include a relative offset from an address of the at least one instruction. The absolute address may include base register information and displacement information.

The converting the absolute address to the relative address may include replacing the base register information and the displacement information with an offset from a position of the at least one instruction.

DESCRIPTION OF EXAMPLE EMBODIMENTS

Figure 1:
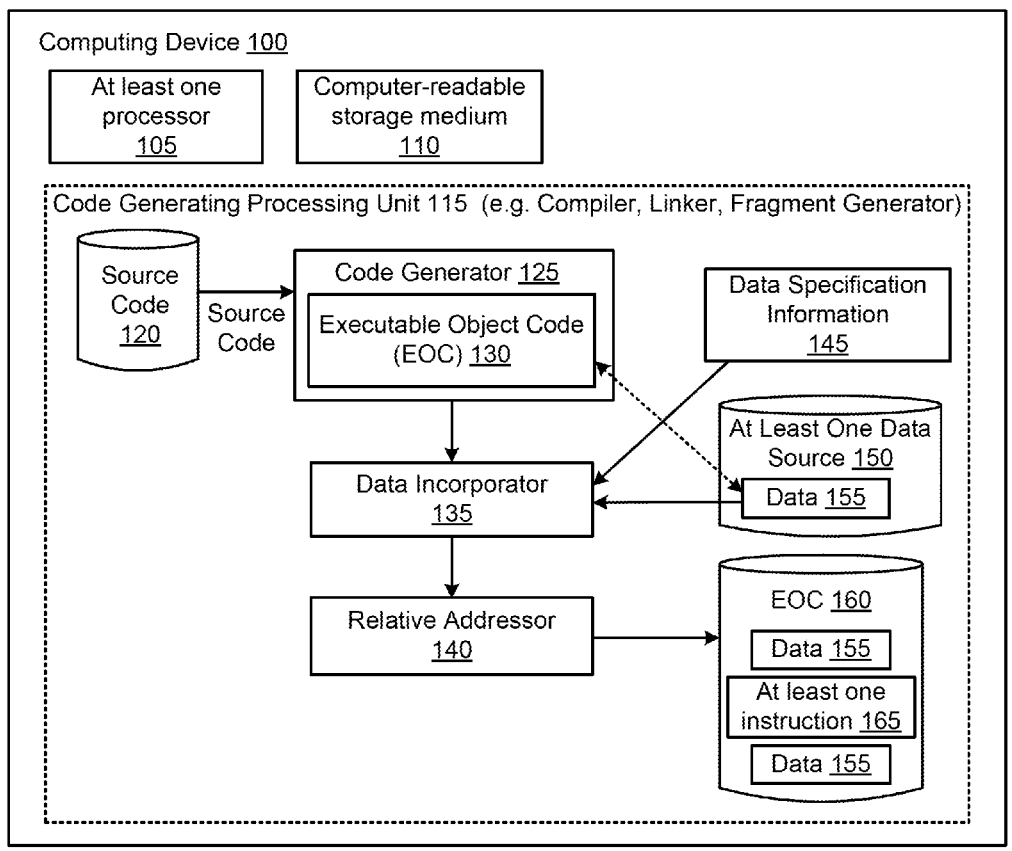
FIG. 1 illustrate a computing device for incorporating data into code such that the data is relative to the code, and, thereby, available for relative addressing according to an embodiment.

The embodiments provide a mechanism that may increase the amount of code that is available for relative addressing, which, in turn, may decrease the CPU usage when the code is executed by the processor. For example, the embodiments provide a computing device (e.g., running a compiler, fragment generator, and/or linker module) that moves data referenced by the code from a data source storing the data into the code itself such that the newly incorporated data is relative to the code, and thereby available for relative addressing. In one example, with respect to a load instruction, the load instruction may indicate to load a first register with certain data from a second register. In this example, the load instruction identifies the data to be loaded from the second register with an absolute address that specifies a base register (e.g., the second register), and a displacement (e.g., a value from the location of the second register). As such, during execution of the load instruction, in order to compute the physical address, a processor may add the address of the second register with the displacement, and load the first register with the data at that calculated physical address during execution of the load instruction. However, computing physical addresses from absolute addresses requires more computer processing (CPU) usage as compared with computing physical addresses from relative addresses.

According to the embodiments, within the context of generating executable code from source code, the computing device may increase the use of relative addressing by incorporating the referenced data into the code itself. As such, more code may be available for relative addressing, which, in turn, will decrease the CPU usage as compared with absolute addressing. With respect to the above example, instead of keeping the absolute address for the load instruction (or generating code with an absolute address), the computing device may transfer the data referenced by the load instruction, which is stored in the second register, into the code itself. Then, the computing device may adjust the load instruction to have a relative address for the newly incorporated data, where the relative address may include a relative offset from a position of the load instruction.

For instance, if a program status word (PSW) indicates that the current instruction (the load instruction) is at a certain position within the executable code, the relative address is based on the PSW and the relative offset. The relative offset may indicate the distance from the current instruction to the location of the newly incorporated data. Accordingly, when the load instruction is being executed, the physical address of the moved data may be calculated based on the PSW and the relative offset, which may require less CPU usage than the absolute addressing. The above example uses information stored in a register, however, the embodiments are not limited to such data. For example, the data may also include control sections, templates, DSECT(s), or generally, any type of data utilized by a computer instruction.

The above described functionalities may be embodied into a compiler, fragment generator, or linker module, or generally, any type of code generating processing unit. For example, in general, a code generating processing unit may receive source data, and generate executable object code. Within this context, the compiler may transform source code written in a source programming language to another language for the purposes of generating executable object code. In the course of generating the executable object code, according to the embodiments, the computing device may transfer the data referenced by an instruction into the executable object code itself, and then adjust the instruction to include a relative address for the transferred data, which may include converting the absolute address to the relative address.

With respect to a fragment generator, the fragment generator may generate code fragments from the source code/executable object code. One particular reason to convert code into fragments is to remove conditional logic and eliminate the number of instructions being executed. However, not all types of code are available for fragmentation. For instance, if a fragment to be generated requires the use of data outside the structure of the code, this fragment is not available for relative addressing. However, according to the embodiments, by incorporating the referenced data into the fragment itself, more code may be considered for fragments.

With respect to a linker module, in the context of generating code, the linker may consolidate one or more executable object codes into a single program. Similar to the fragment generator, more executable object code becomes available for linking to the single program when using relative addressing. Therefore, when these functionalities are embodied into the linker module, the linker module may transfer referenced data into the executable object code, and convert the absolute address of the reference data into the relative address. Then, the linker module may consolidate the executable object codes having the relative addresses into the single program. These and other features are other features are further explained below with reference to the figures.

FIG. 1 illustrate a computing device 100 for incorporating data 155 into code (e.g., EOC 160) such that the data 155 is relative to the code, and, thereby, available for relative addressing according to an embodiment. The computing device 100 may include a main-frame computer, a personal computer, or any type of computer capable of processing information. Accordingly, although not shown in FIG. 1, the computing device 100 may include an operating system (e.g., z/OS in the case of a main-frame computer), as well as other components and functionalities that are well known to one of ordinary skill in the art.

The computing device 100 may include at least one processor 105, and a non-transitory computer-readable storage medium 110 including one or more instructions executable by the at least one processor 105. The instructions may be configured to implement the functionalities described with reference to a code generating processing unit 115. The code generating processing unit 115 may include a compiler, linker module, and/or a fragment generator. For example, the instructions may implement the compiler, linker, and/or the fragment generator, or a portion thereof. The compiler, linker module, and the fragment generator are components that are well known to one of ordinary skill in the art, and only those portions relevant to the embodiments will be discussed therein. However, regardless of the actual implementation of the code generating processing unit 115 as the compiler, the linker module, and/or the fragment generator, the components of the code generating processing unit 115 are common to each implementation.

The code generating processing unit 115 may include a source code database 120 configured to store source code, a code generator 125 configured to receive the source code from the source code database 120, and generate executable object code (EOC) 130 having at least one instruction referencing data 155 from at least one data source 150, a data incorporator 135 configured to transfer the data 155 from the data source 150 into the executable object code 130 such that the data 155 is relative to the at least one instruction (thereby becoming EOC 160), a relative addresser 140 configured to adjust the at least one instruction to include a relative address for the transferred data 155, and a database to store the updated executable object code 160, which includes the data 155 within the executable object code 160 itself. As shown with respect to EOC 160, a location of the data 155 is now relative to the location of the at least one instruction 165. For example, as explained below, the data 155 (which was previously stored in the at least one data source 150), is now transferred into the EOC 160, which is relative to its appropriate instruction 165.

The source code database 120 may store any type of source code known to one of ordinary skill in the art. Then, the code generator 125 may receive the source code from the source code database 120, and generate one or more executable object codes 130. In particular, each executable object code 130 may include one or more instructions referencing the data 155 in the at least one data source 150. For example, the at least one data source 150 may include a register, template, working storage, a control section, a control section having a linked list, and/or generally any type of memory capable of storing data. Accordingly, the data 155 may be the data (or a portion thereof) that is stored in the data source 150, and referenced by the instructions. Also, although the at least one data source 150 is identified as being included in the code generating processing unit 115, the at least one data source 150 may be located in another areas in the computing device 100, as well as stored on a separate computing device that is in communication with the computing device 100. Further, because the instructions require access to the data 155, which may be considered outside the structure of the code, at least one instruction may be considered as including an absolute address, which is further shown with reference to FIG. 2.

Figure 2:
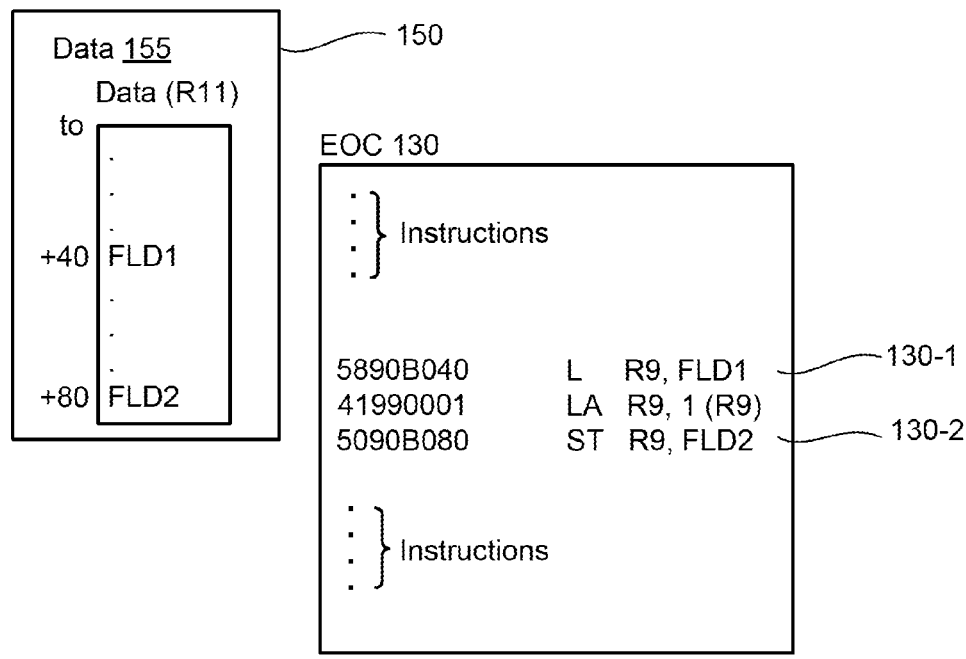
FIG. 2 illustrates executable object code having absolute addressing according to an embodiment.

FIG. 2 illustrates executable object code 130 having absolute addressing according to an embodiment. For example, the executable object code 130 having the absolute addressing may be considered executable object code before being converted to the relative addressing mode, as further explained later in the specification. As shown in FIG. 2, the executable object code 130 may include a number of instructions including a first instruction 130-1, and a second instruction 130-2. The first instruction 130-1, and the second instruction 130-2 are for explanatory purposes only, where the embodiments encompass any type of computer instruction known to one of ordinary skill in the art.

Figure 3:
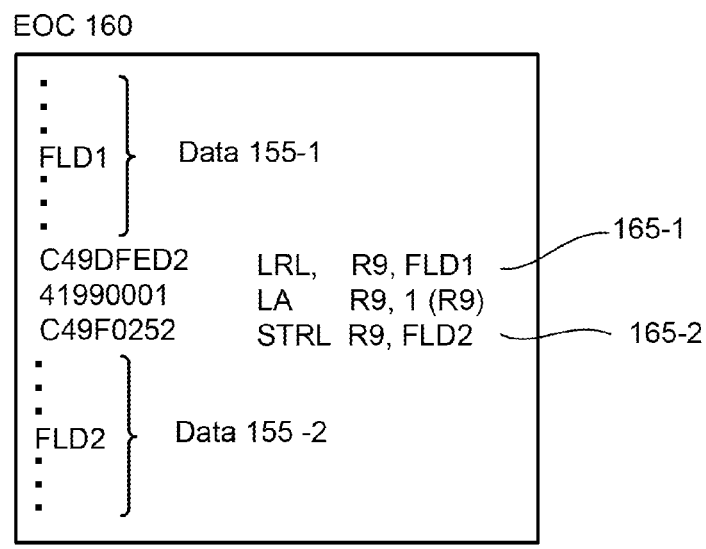
FIG. 3 illustrates the executable object code having the transferred data relative to the instructions and the relative addressing according to an embodiment.

Also, FIG. 2 illustrates the data 155 within the data source 150 that is referenced by the first instruction 130-1 and the second instruction 130-2. In this example, the first instruction 130-1 references data (FLD1) in a register R11, and the second instruction 130-2 references data (FLD2) in the register R11, which are required to carry out its respective operation. In further detail, the first instruction 130-1 provides a hex value x'5890B040' for the instruction of L R9, FLD1. For instance, the opt code (58) indicates that the first instruction 130-1 is a load operation (L) for the data (FLD1) in register R11 (B) at the location +40 (040) into register R9 (90). The absolute address of the data (FLD1) may be considered B040, which is the base register plus displacement. In this case, the value B is the base register, e.g., register 11, and the displacement is 040. However register notations differ from computer to computer. In the case of mainframes, registers are 1-16. Therefore, the actual object code references in the terms of base+displacement are always of the form BDDD. As such, the base register may encompass 0-F (1-16) and the displacement may encompass 000-FFF (0-4095 decimal). In order to compute the physical address of the data (FLD1) during execution, a processor would have to add the value for the base register with the value for the displacement. However, as shown in FIG. 3 and explained below, the data (FLD1) is incorporated into the EOC 130 (thereby becoming EOC 160), which allows it to be accessed via relative addressing. Referring to FIG. 2, the instruction of LA R9, 1 (R9) adds one to the value in register R9. Therefore, this sample code between the first instruction 130-1 and the second instruction 130-2 obtains a data value, increments it, and then stores it somewhere else.

The second instruction 130-2 provides a hex value 5090B080 for the instruction of ST R9, FLD2. For instance, the opt code (50) indicates that the second instruction 130-2 is a store operation (ST) for the data (FLD2) in register R11 (B) at the location +80 (080) into register R9 (90). The absolute address of the data (FLD2) may be considered (x'B080'), which is the base register (x'B' or 11) and the displacement (080). In order to compute the physical address of the data (FLD2) during execution, a processor would have to add the value for the base register with the value for the displacement. However, as shown in FIG. 3 and explained below, the data (FLD2) is incorporated into the EOC 130, which allows it to be accessed via relative addressing.

Referring back to FIG. 1, the data incorporator 135 may receive the executable object code 130 from the code generator 125. The data incorporator 135 may be configured to transfer the data 155 from the data source 150 into the executable object code 130 such that the transferred data 155 is relative to the relevant instruction. For example, the data incorporator 135 may move the data 155 in an area of the executable object code 130 before or after the relevant instruction. For instance, the data incorporator 135 may transfer the data 155 according to data specification information 145. The data specification information may include information that describes the layout of the data 155 in the at least one data source 150. For example, if the data 155 includes a linked list, the data specification information may provide the organization or structure of the linked list. On the other hand, if the data 155 includes a register, the data specification information may simply identify the register. Referring back to FIG. 2, the data specification information may be indicated as FLD1 and FLD2. In a further example, if the data specification information is R11, then the data incorporator 135 may be instructed to move all the data referenced by R11 into the executable object code 130.

Referring back to FIG. 1, then, the relative addresser 140 may be configured to adjust the instructions of the executable object code 130 to include a relative address for the transferred data 155, which may include converting the absolute address to the relative address, as further explained with reference to FIG. 3.

FIG. 3 illustrates the executable object code 160 having the transferred data 155 relative to the instructions 165 and the relative addressing according to an embodiment. For instance, as shown in FIG. 3, the executable object code 160 includes transferred data 155-1 corresponding a first instruction 165-1 (which is the updated instruction of 130-1), and transferred data 155-2 corresponding to a second instruction 165-2 (which is the updated instruction of 130-2). As explained above with respect to FIG. 2, the executable object code 130 (e.g., before transferring by the data incorporator 135 and adjusting by the relative addresser 140) includes the first instruction 130-1 related to the load instruction for loading the data (FLD1) into register R9 from register R11 at the location +40. According to the embodiments, the data incorporator 135 transfers data 155-1 (FLD1) into the executable object code 160, as shown in FIG. 3.

Then, the relative addresser 140 may adjust the first instruction 130-1 of FIG. 2 to include a relative address (e.g., "X'FED2'") for the transferred data, thereby changing the load instruction to a load register long (LRL) instruction (e.g., the first instruction 165-1). Now, the instruction 165-1 includes the hex value x'C49DFED2' corresponding to instruction LRL R9, FLD1. For example, the opt code (C4) indicates that the first instruction 165-1 is now the LRL instruction, and the value X'FED2' indicates a relative address for the data 155-1 of FLD1. The relative address provides an relative offset value (X'FED2') from a position of the first instruction 165-1. The position of the first instruction 165-1 may be determined from a program status word (PSW), and a processor executing the first instruction 165-1 may calculate the physical address of the data 155-1 of FLD1 based on the PSW of the first instruction 165-2 and the offset value. In particular, this processor may add the half word (X'FED2') to the PSW, and load the register R9 with the data 155-1 of FLD1. However, now, the newly transferred data 155-1 is accessible via the relative address ("X'FED2'"), which is relative to the first instruction 165-1 within the executable object code 160. Stated another way, with respect to FIGS. 2-3, the relative addresser 140 may replace the absolute address (e.g., the base register and displacement) of the first instruction 130-1 with the relative address (e.g., the offset from an address of the first instruction 165-1).

The second instruction 165-2 in FIG. 3 has been adjusted in a manner similar to the first instruction 165-1. However, in this case, the data incorporator 135 transfers data 155-2 of FLD2 below the second instruction 165-2. For instance, the data incorporator 135 may transfer the data 155 into the executable object code 160 in an area of the executable object code before or after the relevant instruction 165. Also, because the number of bytes for the relative address is four, the data incorporator 135 has a relatively large space to transfer the data 155 in the executable object code 160. In addition, it is noted that the offset value may be positive or negative. A positive value indicates that the transferred data 155 is placed in an area of the executable object code 160 after the relevant instruction 165. A negative offset value indicates that the transferred data 155 is placed in an area of the executable object code 160 before the relevant instruction 165.

Figure 4:
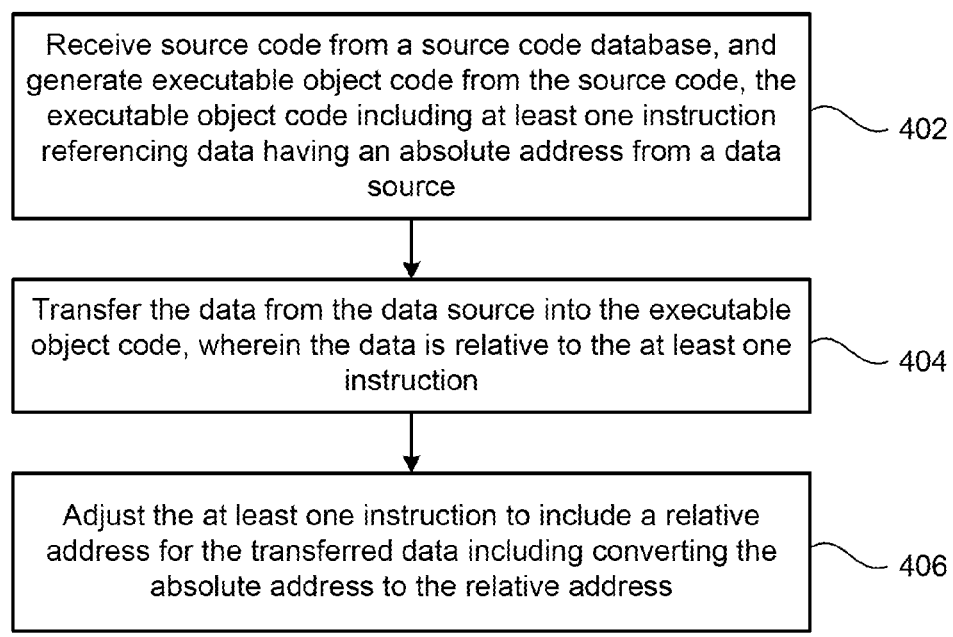
FIG. 4 illustrates a method of incorporating data into code such that the data is relative to the code, and, thereby, available for relative addressing according to an embodiment.

FIG. 4 illustrates a method of incorporating data into code such that the data is relative to the code, and, thereby, available for relative addressing according to an embodiment. Although FIG. 4 is illustrated as a sequential, ordered listing of operations, it will be appreciated that some or all of the operations may occur in a different order, or in parallel, or iteratively, or may overlap in time.

Source code from a source code database may be received, and executable object code may be generated from the source code, where the executable object code includes at least one instruction referencing data having an absolute address from a data source (402). For example, the code generator 125 may receive source code from the source code database 120, and generate executable object code 130 including at least one instruction referencing data 155 having an absolute address from at least one data source 150. For example, as shown with reference to FIG. 2, the executable object code 130 may include a number of instructions including a first instruction 130-1, and a second instruction 130-2. The first instruction 130-1, and the second instruction 130-2 may be any type of computer instruction that references data 155, which is stored in the data source 150. The absolute address may include a base register plus a displacement.

Data from the data source may be transferred into the executable object code, wherein the data is relative to the executable object code (404). For example, the data incorporator 135 may be configured to transfer the data 155 into the executable object code 160 such that the data is relative to the at least one instruction 165. In one example, the data incorporator 135 may move the data 155 in an area of the executable object code 130 before or after the relevant instruction. For instance, the data incorporator 135 may transfer the data 155 according to data specification information 145. The data specification information may include information that describes the layout of the data 155 in the at least one data source 150. For example, if the data 155 includes a linked list, the data specification information may provide the organization or structure of the linked list. On the other hand, if the data 155 includes a register, the data specification information may simply identify the register.

The at least one instruction may be adjusted to include a relative address for the transferred data including converting the absolute address to the relative address (406). For example, the relative addresser 140 may be configured to adjust the at least one instruction 165 to include a relative address for the transferred data 155 including converting the absolute address In one example, the relative addresser 140 may replace the absolute address with the relative address. The relative address may include a relative offset indicating a offset from the at least one instruction 165. Further, if the absolute address indicates a base register plus a displacement, the relative addresser 140 may replace the base register and displacement with the relative offset. Accordingly, when the at least one instruction 165 is being executed during runtime of the program, the physical address of the transferred data 155 may be calculated based on the PSW and the relative offset, which may require less CPU usage than the absolute addressing. The above example uses information stored in a register, however, the embodiments are not limited to such data. For example, the data may also include control sections, templates, DSECT(s), or generally, any type of data utilized by a computer instruction.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, computing device, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. A computing device comprising:
at least one processor;
a non-transitory computer-readable storage medium including instructions executable by the at least one processor, the instructions configured to incorporate data into code wherein the data is relative to the code and available for relative addressing, including:
a code generating processing unit configured to increase use of relative addressing for instructions having absolute addressing, the code generating processing unit comprising:
a code generator configured to receive source code from a source code database, and generate executable object code from the source code, the executable object code including at least one instruction referencing data with an absolute address such that the data is stored in a data source outside a structure of the executable object code, the data being information subject to an operation specified by the at least one instruction;
a data incorporator configured to transfer the data from the data source into the executable object code such that the data is included within the structure of the executable object code in a location that is relative to the at least one instruction; and
a relative addresser configured to adjust the at least one instruction to replace the absolute address of the transferred data with a relative address for the transferred data including converting the absolute address of the data to the relative address of the data.

2. The computing device of claim 1, wherein the relative address includes a relative offset from an address of the at least one instruction.

3. The computing device of claim 1, wherein the absolute address includes base register information and displacement information.

4. The computing device of claim 3, wherein the converting the absolute address to the relative address includes replacing the base register information and the displacement information with an offset from a position of the at least one instruction.

5. The computing device of claim 1, wherein the code generator includes one of a compiler, fragment generator, and linker module.

6. The computing device of claim 1, wherein the data source includes at least one of a register, working storage, control section, and a control section having a linked list.

7. The computing device of claim 1, wherein the data incorporator configured to transfer the data from the data source into the executable object code includes moving the data from the data source in an area of the executable object code before the at least one instruction.

8. The computing device of claim 1, wherein the data incorporator configured to transfer the data from the data source into the executable object code includes transferring the data from the data source according to data specification information, the data specification information indicating which data to transfer to the executable object code.

9. A non-transitory computer-readable medium storing instructions that when executed by at least one processor are configured to:
increase use of relative addressing for instructions having absolute addressing, the instructions to increase use of relative addressing configured to:

receive source code from a source code database;
generate executable object code from the source code, the executable object code including at least one instruction referencing data with an absolute address such that the data is stored in a data source outside a structure of the executable object code, the data being information subject to an operation specified by the at least one instruction;
transfer the data from the data source into the executable object code such that the data is included within the structure of the executable code in a location that is relative to the at least one instruction; and
adjust the at least one instruction by replacing the absolute address of the transferred data with a relative address for the transferred data including converting the absolute address of the data to the relative address of the data.

10. The non-transitory computer-readable medium of claim 9, wherein the relative address includes a relative offset from an address of the at least one instruction.

11. The non-transitory computer-readable medium of claim 9, wherein the absolute address includes base register information and displacement information.

12. The non-transitory computer-readable medium of claim 11, wherein the converting the absolute address to the relative address includes replacing the base register information and the displacement information with an offset from a position of the at least one instruction.

13. The non-transitory computer-readable medium of claim 9, wherein the instructions are configured to implement at least a portion of a compiler, fragment generator, or linker module.

14. The non-transitory computer-readable medium of claim 9, wherein the data source includes at least one of a register, working storage, control section, and a control section having a linked list.

15. The non-transitory computer-readable medium of claim 9, wherein the transfer the data from the data source into the executable object code includes moving the data from the data source in an area of the executable object code after the at least one instruction.

16. The non-transitory computer-readable medium of claim 9, wherein the transfer the data from the data source into the executable object code includes transferring the data from the data source according to data specification information, the data specification information indicating which data to transfer to the executable object code.

17. A method comprising:
increasing use of relative addressing for instructions having absolute addressing by incorporating data having an absolute address into executable object code, including:
receiving, with at least one processor, source code from a source code database;
generating, with the at least one processor, the executable object code from the source code, the executable object code including at least one instruction that references the data having the absolute address, the data having the absolute address being stored in a data source outside a structure of the executable object code, the data having the absolute address being information subject to an operation specified by the at least one instruction;
transferring, with the at least one processor, the data having the absolute address from the data source into the executable object code such that the data is included within the structure of the executable object code in a location before the at least one instruction; and
converting the absolute address of the transferred data to a relative address, and adjusting the at least one instruction to recite the relative address for the transferred data instead of the absolute address.

18. The method of claim 17, wherein the at least one instruction specifies a read operation on the data, and the data is stored in a register outside the structure of the executable object code, wherein the data is pulled into the executable object code, and the read operation is adjusted to recite the relative address for the transferred data instead of the absolute address.

19. The method of claim 17, wherein the absolute address is removed from the at least one instruction, and replaced with the relative address for the transferred data.

20. The method of claim 19,
wherein the at least one instruction includes a first instruction and a second instruction, the first instruction specifying an operation on first data stored in a first register outside the structure of the executable object code, the first instruction specifying an absolute address for the first data, the second instruction specifying an operation on second data stored in a second register outside the structure of the executable object code, the second instruction specifying an absolute address for the second data,
wherein the first data is transferred to a location within the structure of the executable code that is before the first and second instructions, and the second data is transferred to a location within the structure of the executable code that is after the first and second instructions,
wherein first instruction is modified by replacing the absolute address for the first data with a relative address for the first data, and the second instruction is modified by replacing the absolute address for the second data with a relative address for the second data.

* * * * *